June 30, 1970 D. D. KAISER 3,517,637

PUSHBUTTON SIGNALING ARRANGEMENT

Filed April 29, 1968

INVENTOR.
DAVID D. KAISER
BY Philip J. Zeisnal
ATTORNEY.

United States Patent Office 3,517,637

Patented June 30, 1970

3,517,637

PUSHBUTTON SIGNALING ARRANGEMENT

David D. Kaiser, Cedarville, Ill., assignor to Honeywell Inc., Minnneapolis, Minn., a corporation of Delaware Filed Apr. 29, 1968, Ser. No. 724,793
Int. Cl. G01d *21/00*
U.S. Cl. 116—114 6 Claims

ABSTRACT OF THE DISCLOSURE

A signal arrangement especially for a pushbutton keyboard or matrix where indication of an actuated pushbutton is provided by the exposure of the side walls of adjacent pushbuttons which are distinctly colored with respect to the remainder of the arrangement.

Figure 1:
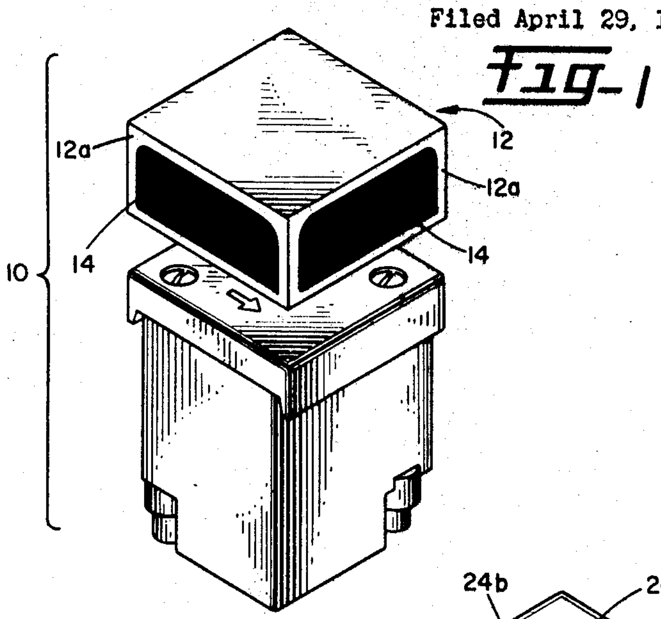

The present invention is directed to a signal arrangement for a plurality of adjacently disposed elements which are independently movable in opposite directions and associated so that upon movement of an element, a signal is exposed on a contiguous portion of an adjacent or on contiguous portions of each adjacent element, thereby indicating the element moved.

In arrays of elements, each element of which is movable between two extreme positions, such as pushbuttons of keyboards, for example, it is often quite difficult when somewhat removed from the keyboard to visually determine which pushbutton or pushbuttons are in an actuated condition. This is the case because the pushbuttons are usually formed of the same color material and closely spaced so that non-uniform pushbutton orientation is difficult for the viewer to discern.

While electrical illumiation means can be utilized with each element to provide the desired signal upon actuation, this adds expense and complexity which sometimes is not justified in view of the application involved.

As disclosed herein a signal arrangement is provided which is extremely inexpensive and very straightforward. Thus, in the preferred embodiment, a keyboard or matrix is disclosed with similar, closely spaced, independently movable pushbuttons all arranged to be normally located at an outer position and to be actuated to a depressed position. With the pushbuttons at the outer position, the keyboard presents no signal. However, upon actuation of a pushbutton to a depressed position, a signal is exposed which indicates the depressed pushbutton. The signal is provided by means disposed on the continguous side wall portions of adjacent pushbuttons. It will be appreciated that the signal means is normally concealed because the pushbuttons are closely spaced and the side wall portions are not visible with all the pushbuttons in the outer position. The signal means can be provided by a color distinctive with respect to the remainder of the pushbuttons and further can be applied to the side wall portions by means of reflective sheeting. This latter expedient allows for incorporation of the invention in keyboards already in the field.

It may be desirable to provide a signal completely surrounding the depressed pushbutton so that regardless of the position of the viewer with respect to the keyboard the depressed pushbutton can be determined. Where the depressed pushbutton is surrounded by other pushbuttons, this condition obtained. However, the pushbuttons in the perimeter of the keyboard require auxiliary means to provide such a condition. The auxiliary means in the preferred embodiment comprises frame means which includes signal means on the side wall portion thereof contiguous with the side wall portions of the adjacent pushbuttons. Thus depression of a pushbutton located on the perimeter of the keyboard exposes a signal comprised partially of signal means provided on contiguous side walls of adjacent pushbuttons and partially of signal means provided on contiguous side walls of the frame means.

It is, therefore, an object of the present invention to provide a signal arrangement for a pushbutton keyboard which is inexpensive and non-complex in character.

It is another object of the present invention to provide such a signal arrangement which can be incorporated in keyboards already in the field.

Figure 2:
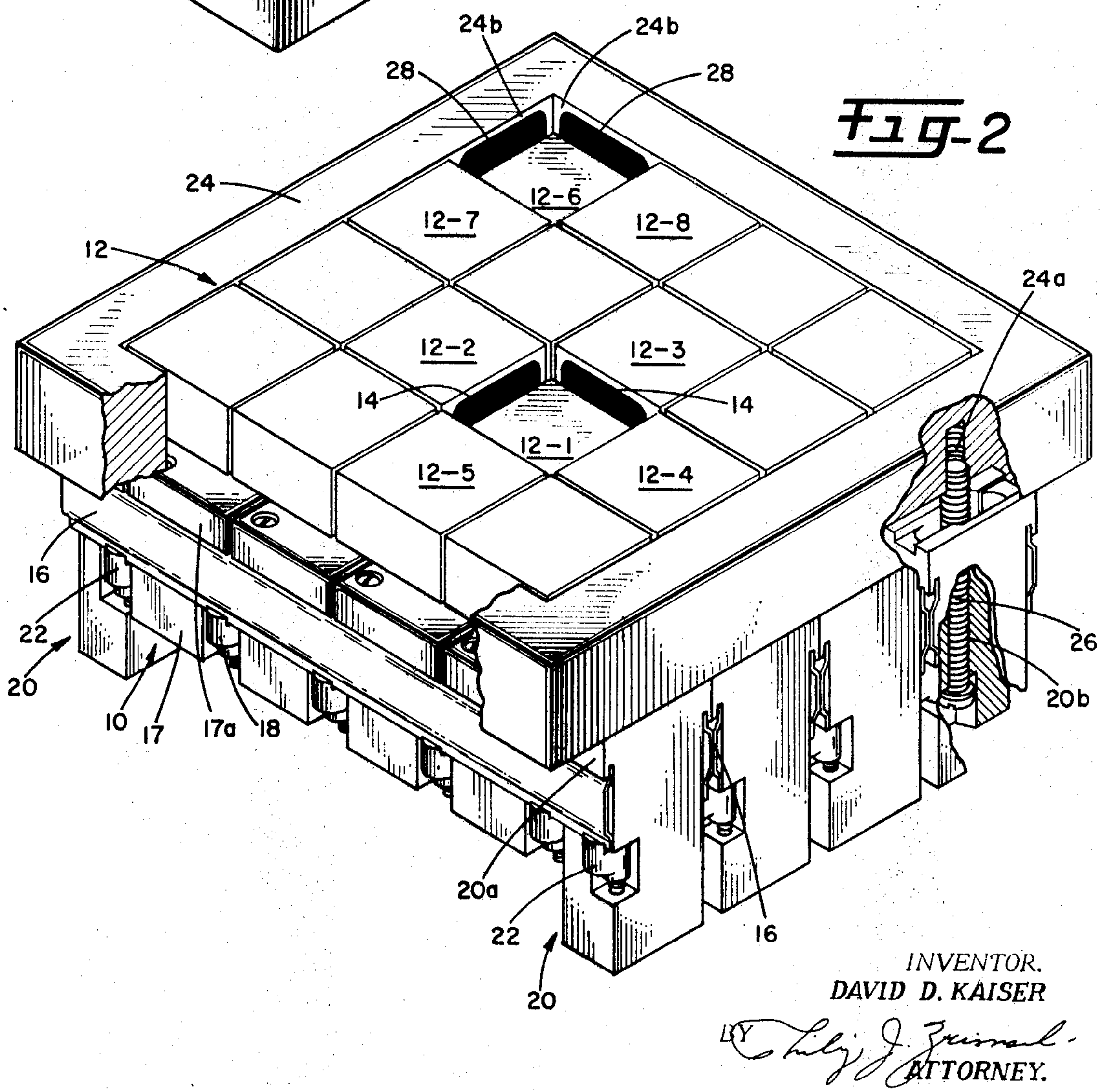

These and other objects will become apparent from a reading of the following specification taken together with the appended claims in conjunction with the drawing in which:

FIG. 1 is a perspective view of a pushbutton operated switch for utilization in a keyboard, the pushbutton of which includes the signaling means for accomplishing the invention; and FIG. 2 is a perspective view of a four by four pushbutton keyboard wherein two of the pushbuttons are actuated, thereby exposing the signals to give an indication of the pushbuttons so actuated.

In FIG. 1, a pushbutton switch 10 incorporating signal means for practicing the invention is disclosed. The pushbutton switch 10 includes a right angle parallelepiped pushbutton 12 having signal means 14 on each of the four side walls 12*a*, two of which are visible. The signal means 14 can be painted on the side walls 12*a* or provided thereon by means of reflective sheeting, for example. Further, the signal means 14 preferably should be of a contrasting form relative to the remainder of the pushbutton, for example, contrasting with respect to color or texture.

A number of the pushbutton switches disclosed in FIG. 1 can be placed in an array in the form of a pushbutton keyboard or matrix as shown in FIG. 2. A number of pushbutton switches 10 are each secured to mounting bars 16 in the manner disclosed in the Cox, Jr. Pat. 3,300,613 by means of shoulders 17*a* provided on the upper portions of the bodies 17 of the pushbutton switches and mounting lugs 18 associated therewith to provide an assembly. Such an assembly of pushbutton switches 10 and mounting bars 16 is associated with a pair of end supports 20 which are secured to the mounting bars by means of shoulder portions 20*a* and mounting lugs 22, again in the manner disclosed in the forementioned Cox, Jr. patent. Assemblies of the pushbutton switches 10, mounting bars 16 and end supports 20 can in turn be mounted side by side to frame means 24 by utilization of mounting screws 26 located in through openings 20*b* provided in the end supports and disposed in threaded openings 24*a* provided in the frame means. The array provided by the pushbutton switches 10 with the right angle parallelepiped pushbuttons 12 associated with the frame means 24 provides for a very closely spaced arrangement of the pushbuttons and one in which it would be difficult to determine which of the pushbuttons is actuated from an outer position to a depressed position without the utilization of the present invention.

With the pushbuttons 12 all incorporating the signal means 14, it becomes apparent that actuation of a pushbutton such as 12–1 exposes the signal means of pushbuttons 12–2, 12–3, 12–4 and 12–5 so it can be determined that pushbutton 12–1 is in a depressed position. While FIG. 2 shows only the signal means 14 provided on pushbuttons 12–2 and 12–3, it is obvious that if the array were viewed from the opposite direction the signal means provided on pushbuttons 12–4 and 12–5 could be seen.

Where the pushbutton actuated is bounded in part by the frame means 24, such as pushbutton 12–6, then the provision of signal means 28 on the side walls 24*b* of the frame means becomes visible as shown in FIG. 2. Again, if the array were viewed from the opposite direction, the signal means provided on pushbuttons 12–7 and 12–8 would be visible.

As disclosed in the preferred embodiment, a signaling arrangement has been disclosed in which it can be determined which pushbutton or pushbuttons have been actuated by utilization of signal means provided on the side walls of contiguous pushbuttons and on the contiguous walls of frame means surrounding the pushbuttons.

It is obvious that the invention disclosed could be applied to keyboards or matrices already in the field by merely painting the side walls of the pushbuttons or by applying reflective sheeting thereto as well as to the appropriate surfaces of the frame means.

The signaling arrangement provided by the invention is extremely straightforward and economical and can be utilized in new construction or existing construction. While the preferred embodiment has been disclosed, there are other arrangements possible utilizing the concepts of my invention and therefore the scope of the invention should be determined from the following claims.

I claim:

1. A signal arrangement comprising: a plurality of elements adjacently disposed for independent movement in opposite directions, movement of an element from a first position to a second position exposing signal means provided at least in part by a contiguous portion of each adjacent element so as to indicate the element moved, movement of the element in the opposite direction concealing the signal means.

2. The arrangement of claim 1 wherein the elements are similarly shaped pushbutton actuators.

3. The arrangement of claim 2 wherein the similarly shaped pushbutton actuators are right angle parallelepipeds.

4. The arrangement of claim 1 wherein the signal is provided by a form contrasting with respect to the remainder of the element.

5. The arrangement of claim 4 wherein the contrasting form is provided by reflective sheeting of a distinctive color adhesively secured to the contiguous portion.

6. The arrangement of claim 1 wherein frame means is disposed contiguous about the outer perimeter of the plurality of elements so that a portion of the signal means is provided by said frame means when the element moved is adjacent thereto.

References Cited

UNITED STATES PATENTS

| | | | |
|---|---|---|---|
| 1,801,484 | 4/1931 | Bricken | 116—114 XR |
| 2,437,555 | 3/1948 | Rees | 200—167 |
| 3,129,418 | 4/1964 | Delatour | 340—345 |
| 3,187,321 | 6/1965 | Kament | 340—345 |
| 3,213,269 | 10/1965 | Melvin et al. | 240—1 |
| 3,305,677 | 2/1967 | Bov | 240—2 |
| 3,358,111 | 12/1967 | Dzierzbicki et al. | 200—167 |

LOUIS J. CAPOZI, Primary Examiner

U.S. Cl. X.R.

116—135; 197—2; 200—167; 235—145; 240—2; 340—365